Patented Dec. 25, 1951

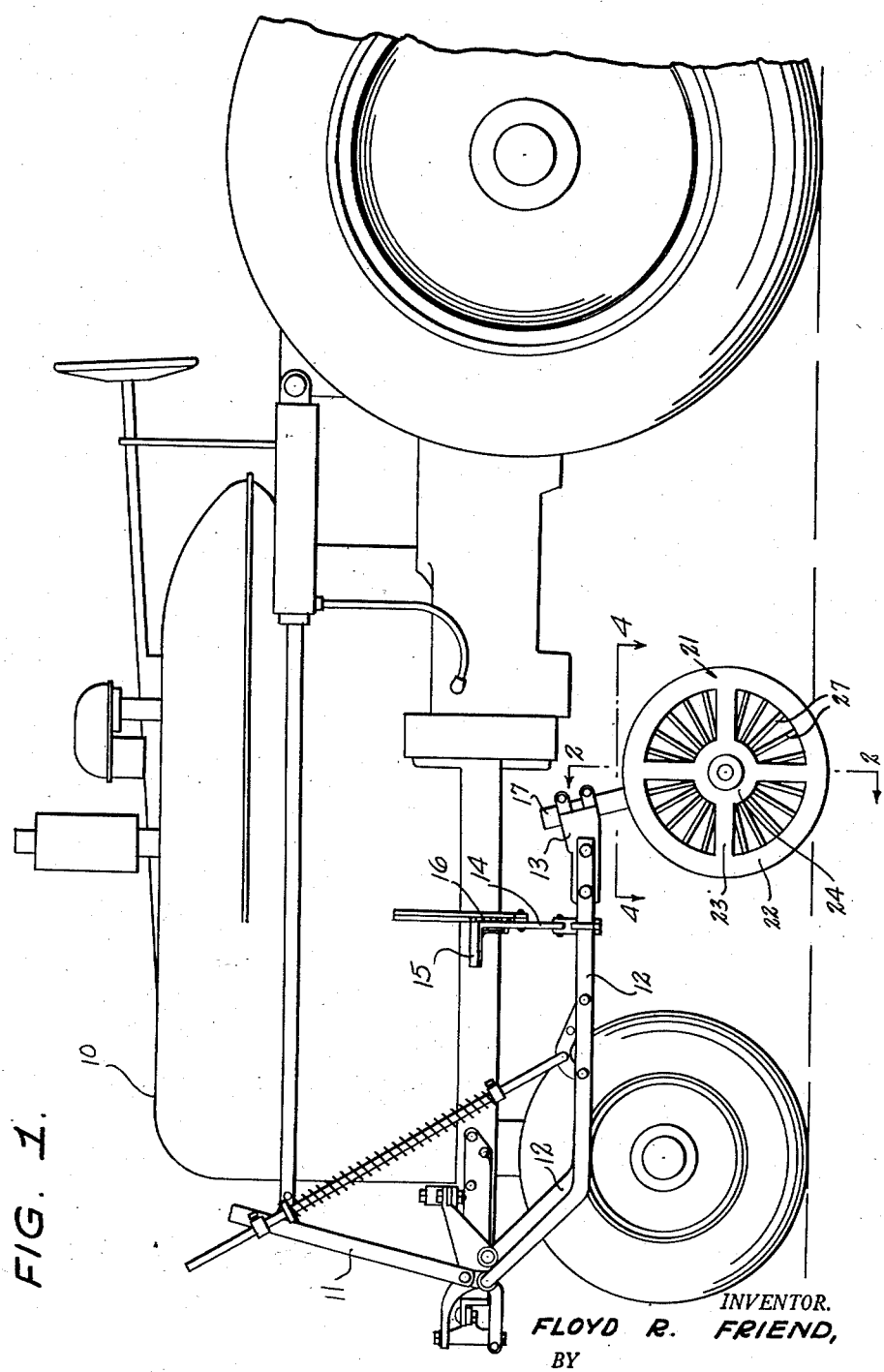

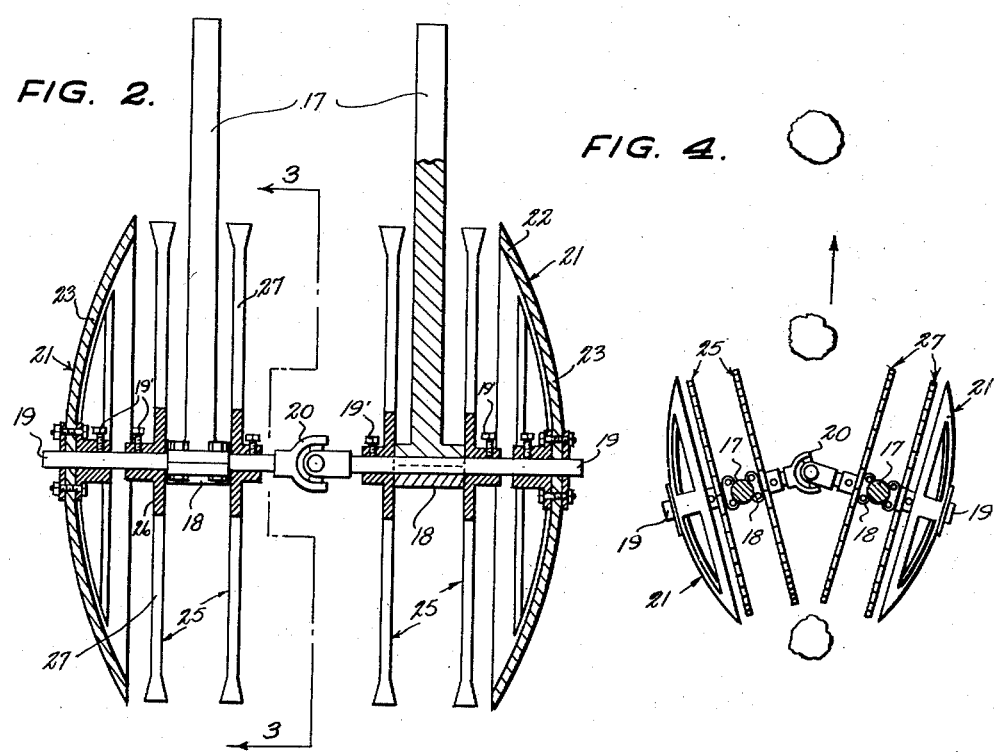
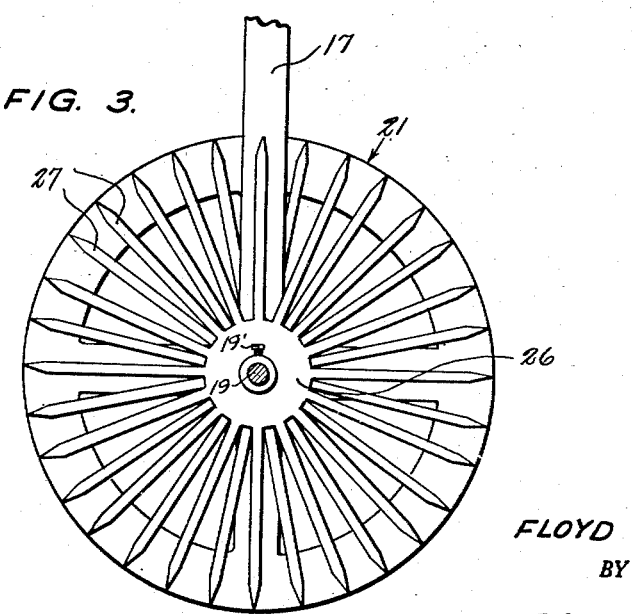

2,579,561

UNITED STATES PATENT OFFICE 2,579,561

CRUST BREAKING CULTIVATOR

Floyd R. Friend, Lubbock, Tex.

Application August 31, 1948, Serial No. 46,953

3 Claims. (Cl. 97—218)

My invention relates to crop-working machines, and more particularly to machines adapted for the working of row crops and for destroying weeds. Many row crops are planted in furrows and lightly covered with soil in an amount insufficient to fill the furrow. Rains following the planting cause the soil above the seeds to become crusted, whereby the sprouting seeds have difficulty in breaking through the soil. In such a situation, it is desirable to work the crop by breaking up the crusted soil above the seeds, whereby to expedite the breaking through of the seedlings through the surface of the ground. Likewise, as the seedlings continue to grow, it is desirable to cover and destroy any weeds or undesirable growth which may appear on either side of the seedlings and also to heap soil about the seedlings to provide lateral support for the same. Also, once the seedlings have a good start, it is desirable to fill the furrow in which they are planted. So far as is known, there is no crop-working device capable of performing all of the above functions.

With the foregoing in view, it is an object of my invention to provide an improved crop-working device capable of being adjusted to perform all of the above-mentioned functions, and others which will be apparent to those skilled in the art.

A further object is to provide an improved crop-working machine of the class described which includes a pair of crop-working assemblies, means coupling said assemblies together, means mounting said assemblies for rotation as a unit, means for adjusting said assemblies laterally toward and away from each other, and means for adjusting said assemblies whereby the same may be toed in.

A further object is to provide in an improved crop-working machine such as that last described a crop-working assembly which includes a crop-working disc disposed upon one side of the crop row and a second assembly including a crop-working disc disposed upon the other side of the crop row.

A further object is to provide an improved crop-working machine such as that last described wherein the two assemblies each includes at least one crop-working wheel comprising a plurality of substantially radially-directed straight or curved spikes operatively coupled to the disc laterally inwardly of the same.

A further object is to provide an improved crop-working machine which includes a pair of laterally-spaced, crop-working assemblies adapted to straddle a crop row, and wherein each assembly comprises a pair of laterally-spaced spiked wheels, means universally coupling said assemblies together for rotation as a unit, and means rotatably supporting said assemblies for independent tilting movement through two planes whereby said assemblies may be independently toed in and out in two planes.

Other objects and advantages reside in the particular structure of the invention, combination and arrangement of the several parts thereof, and will be readily understood by those skilled in the art upon reference to the attached drawings in connection with the following specification, wherein the invention is shown, described and claimed.

In the drawings:

Figure 1 is an elevational view of any well known form of tractor showing the crop-working device according to the invention applied thereto;

Figure 2 is a transverse vertical sectional view taken substantially on the plane of the line 2—2 of Figure 1, but on an enlarged scale;

Figure 3 is a transverse vertical sectional view taken substantially on the plane of the line 3—3 of Figure 2;

Figure 4 is a plan view of the device according to the invention showing the same in operative association with a crop row, and taken substantially on the plane of the line 4—4 of Figure 1.

Referring specifically to the drawings, wherein like reference characters have been used throughout the several views to designate like parts, and referring at first to Figure 1, 10 designates any suitable tractor or like crop-working machine which may include any suitable manually-operated or power-operated lift 11 which is effective upon actuation to raise or lower one or more beams 12 which are disposed laterally of the tractor 10. The rearwardly-directed free end of each beam 12 is adapted to include any suitable clamp 13 for the operative connection to any of a plurality of crop-working devices. In the embodiment shown, there are a pair of supporting beams 12, each of which has a clamp 13 on the free end thereof, although but a single clamp is shown. Likewise, the beams 12 are operatively engaged by the free ends of the arms 14 of a substantially inverted U-shaped yoke which is adjustable by any suitable handle 15 and quadrant 16 to move the beams 12 laterally toward and away from each other. The effect of this actuation is to toe the crop-working device of the invention, which is supported by the clamps 13, inwardly or outwardly on parallel horizontal planes substantially parallel to a crop row.

The crop-working device according to the invention comprises a pair of laterally-spaced carrying bars 17, the upper ends of which are preferably cylindrical in form, whereby they may be adjustably clamped in the clamps 13 of the beams 12. As best seen in Figure 2, the lower ends of the carrying bars 17 are formed to provide longitudinally-divided journals or bearings 18, each of which is adapted to rotatably support a substantially identical shaft section 19. The shaft sections 19 are universally coupled together in end-to-end relation by any suitable universal joint 20, whereby the shaft sections 19, together with the universal joint 20, comprise a jointed shaft for rotation as a unit. The outer free end of each shaft section has fixed thereto in any suitable manner a crop-working disc 21 which is preferably concavo-convex in form with the concave face thereof facing laterally inwardly. However, if desired, the concave faces of the discs may be laterally outwardly directed as when it is desired to cut earth away from a crop row. The discs may be solid or, as shown, may comprise rims 22 supported by radially-directed spokes 23 from a hub 24.

Each shaft section 19 has fixed thereon in laterally inwardly-spaced relation to the disc 21 a wheel 25 comprising a hub 26 and a plurality of substantially radially-directed straight or curved spikes 27. In the embodiment disclosed, there is a pair of wheels 25 fixed to each shaft section on opposite sides of the bearing or journal 18. In such an event, the spikes 27 of each wheel 25 of each pair are staggered relative to each other, as clearly shown in Figure 3. hWeels 25 and discs 21 are adjustable along shafts 19 to vary the spacing as desired and the discs and wheels are secured in a selected adjusted relation by any suitable means, such as the set screws 19'.

In the operation of the device, the assemblies comprising a shaft section, a disc 21 and/or one or more spiked wheels 27, straddle a crop row, such as that indicated in Figure 4. In the event that the seeds have not broken through the surface of the soil, and it is desired to break the crust on the soil above the seeds, the assemblies are toed in on horizontal planes substantially parallel to the crop rows, whereby the bottom ends of the lowermost spikes 25 are very close together and are effective to puncture and break up the soil above the seeds when the machine is traversed along a crop row. On the other hand, when the seedlings have broken through the surface of the soil, and it is desired to partially fill the furrow with soil to provide lateral support around the seedlings, the assemblies are toed out on the vertical axes of the carrier bars 17, as shown in Figure 4. When the assemblies are moved in the direction of the arrow of Figure 4, weeds and the like are destroyed and the soil is broken up by the toothed wheels 25. The broken soil is then moved laterally inwardly through wheels 25 by the discs 21 to provide lateral support for the seedlings. Obviously, the angle of toeing in or out is readily controlled by the operative connection 20 between the assemblies, whereby to scoop more or less dirt onto the plants and/or to scoop dirt away from the plants by toeing the assemblies inwardly on the axes of the carrier bars 17. Also, it is apparent that with the shaft sections aligned and horizontally disposed, as shown in Figure 2, the device is effective to break up the soil on either side of a crop row to facilitate the soaking in of rainwater or other water. Obviously, other uses for the coupled assemblies will occur to those skilled in the art.

While I have shown and described what is now thought to be a preferred embodiment of the invention, it is to be understood that the same is susceptible of other forms and expressions. Consequently, I do not limit myself to the precise structure shown and described hereinabove except as hereinafter claimed.

I claim:

1. In a crop-working machine adapted to traverse a crop row, a pair of substantially identical shaft sections, a universal joint connecting said sections together in end-to-end relation to provide a jointed shaft, at least one wheel fixed to each shaft section, each wheel comprising a plurality of substantially radially-directed spikes, a disc fixed to each shaft section outwardly of each wheel, a separate bearing providing means rotatably supporting each shaft section, separate adjustable means supporting each bearing providing means on said machine, each adjustable means being privotable about a substantially vertical axis, whereby said wheels and discs may be toed in and out, said wheels being spaced to straddle a crop row as the same is traversed by said machine.

2. In a crop-working machine adapted to traverse a crop row, a pair of substantially identical shaft sections, a universal joint connecting said sections together in end-to-end relation to provide a jointed shaft, a pair of laterally-spaced wheels fixed to each shaft section, each wheel comprising a plurality of substantially radially-directed spikes, the spikes of one wheel of each pair being staggered relative to the spikes of the other wheel of such pair, a disc fixed to each shaft section outwardly of each pair of wheels, a pair of substantially vertically-disposed carrying bars each including a lower end providing a bearing for a shaft section, means mounting said carrying bars on said machine for pivotal movement on their long axes, whereby said wheels and discs may be toed in and out, said wheels being spaced to straddle a crop row as the same is traversed by said machine.

3. In a crop-working machine adapted to traverse a crop row, a pair of substantially identical shaft sections, a universal joint connecting said sections together in end-to-end relation to provide a jointed shaft, a pair of laterally-spaced wheels fixed to each shaft section, each wheel comprising a plurality of substantially radially-directed spikes, the spikes of one wheel of each pair being staggered relative to the spikes of the other wheel of such pair, a disc fixed to each shaft section outwardly of each pair of wheels, a pair of substantially vertically-disposed carrying bars each including a lower end providing a bearing for a shaft section, each bearing rotatably supporting a shaft section between said wheels thereof, means mounting said carrying bars on said machine for pivotal movement on their longitudinal axes, whereby said wheels and discs may be toed in and out, said wheels being spaced to straddle a crop row as the same is traversed by said machine.

FLOYD R. FRIEND.

REFERENCES CITED

The following references are of record in the file of this patent:

UNITED STATES PATENTS

| Number | Name | Date |
|---|---|---|
| 883,304 | Espich | Mar. 31, 1908 |
| 1,454,724 | Carey | May 8, 1923 |
| 2,199,674 | Ronning | May 7, 1940 |